Oct. 13, 1936.　　　L. E. WEBSTER　　　2,057,256
SHOVEL
Original Filed Nov. 29, 1933
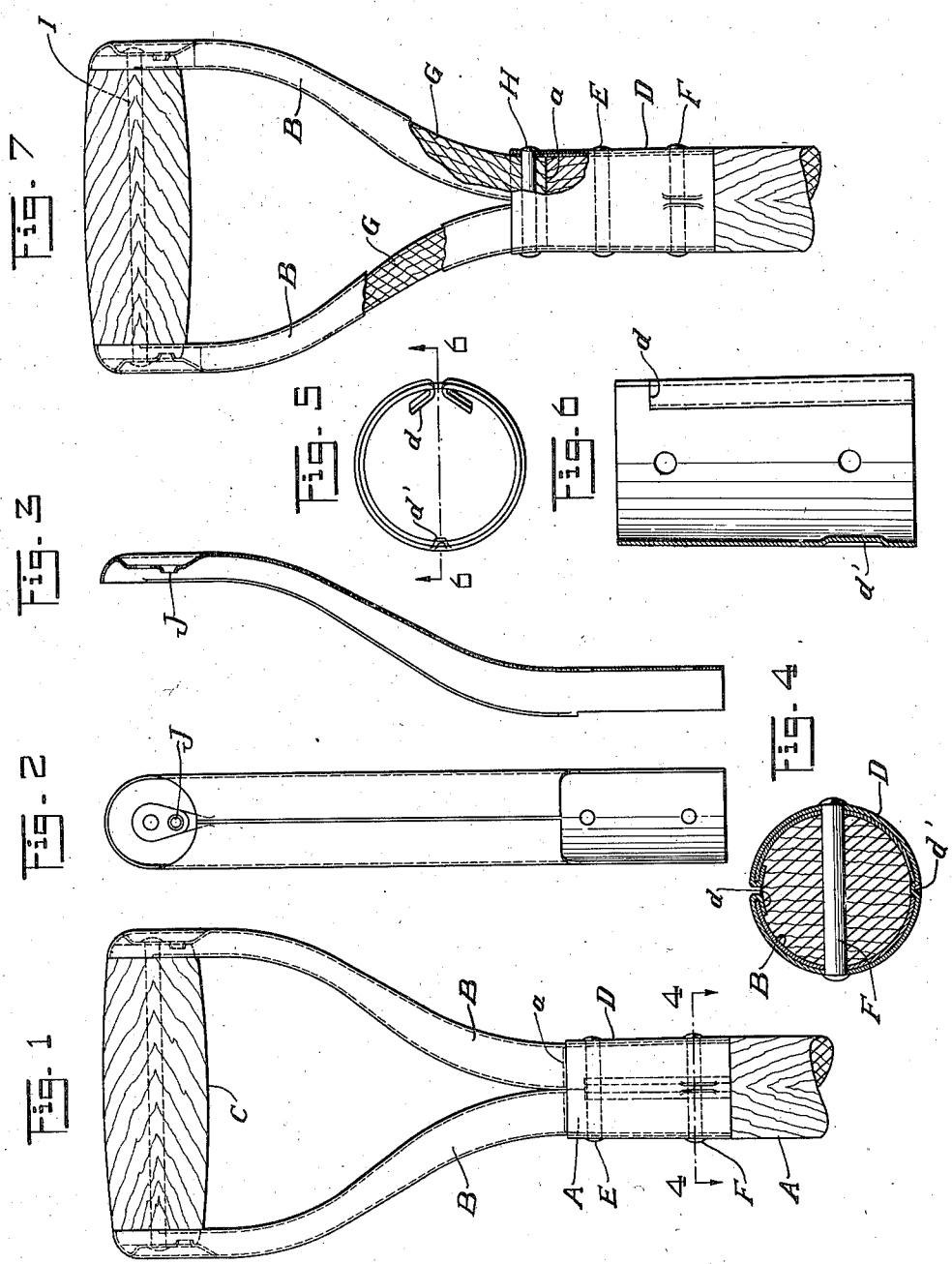
INVENTOR
Lewis E. Webster Patented Oct. 13, 1936

2,057,256

UNITED STATES PATENT OFFICE 2,057,256

SHOVEL

Lewis E. Webster, Wilkes-Barre, Pa.

Application November 29, 1933, Serial No. 700,183
Renewed March 14, 1936

3 Claims. (Cl. 294—57)

This invention relates to improvements in shovels and shovel handles therefor and more particularly to what are known in the trade as pressed steel D-shovel handles.

It is the object of the invention to provide such a D-shovel handle and having not only the strength required of such handles but a greater strength adapting the shovel to which the handle may be applied for heavy duty work and also protecting the handle interiorly against rust and consequent weakening and breakage.

In the accompanying drawing,—

Figure 1 is a front elevation of a shovel and shovel handle embodying my invention, comprising a pair of pressed steel tubular arms connected at one end with the shovel stale and at the other end provided with a hand grip;

Figure 2 is an inner side view of one of the handle arms;

Figure 3 is an edge view of the same;

Figure 4 is a cross section of the shovel handle and shovel stale on the line 4—4 of Figure 1, showing, in addition to the parts above referred to, a reinforcing band enclosing the lower or socket ends of the handle arms and the upper end of the stale.

Figure 5 is a top view of the reinforcing band before its application to the handle arms and shovel stale;

Figure 6 is a vertical section thereof on the line 6—6 of Figure 5;

Figure 7 is a front elevation of a shovel and handle substantially like that of Figure 1 except for the addition of a wood filler or plug in each of the tubular handle arms.

Referring to said drawing, A represents a shovel stale, B hollow pressed-steel arms connected therewith at their lower or socket ends, C a handle grip of wood connected with the upper ends of the arms, and D the reinforcing band before referred to.

One of the objects of the present invention, not heretofore referred to, is to provide a shovel handle of the desired strength in which welding of abutting or overlapping parts is unnecessary. This is a consideration of quite some importance because welding is an expensive operation and must be followed by tests to ascertain if the necessary weld has really been attained, this in turn being followed by loss of material or time, or both, if the weld is found to be imperfect. Another object and advantage will be referred to later.

The lower ends of the tubular arms B are substantially semi-circular in cross section and together constitute a substantially circular socket embracing the upper tapered end of the shovel stale A with a short distance between the contiguous ends of the two arms, as shown for example in Figure 4, the stale A in the completed shovel ending at the dotted line $a$, Figure 1.

This socket portion of the arms B, together with the upper end of the stem A which they enclose, is in turn encircled by the reinforcing band D which, as indicated in Figure 5, has inwardly bent hooks $d$ fitting over two of the contiguous edges of the arms B, B, and an inwardly punched projection $d'$ engaging the other contiguous edges of the arms B.

The reinforcing band D and the lower socket ends of the arms B are secured to the upper end of the shovel stale A by rivets E, F.

In the manufacture of my shovel handle the tubular arms B are suitably shaped by dies. The reinforcing band is then applied to the lower or socket end of the arms, with the inward projection $d'$ between two of the contiguous edges of the arms and the hooks $d$ engaged with the other contiguous edges of the arms. Then by means of suitable dies the hooks $d$ are bent over the latter edges of the arms, from the position in which these hooks are shown in Figure 5 to the position in which they are shown in Figure 4. The arms B and the reinforcing band D are then fitted over the upper end of the shovel stale and these parts are then secured to the latter by means of the rivets E, F.

One result of this construction in addition to that of economy of manufacture, before referred to, is that by reason of the provision of the reinforcing band D all seams and sharp edges that might wear or injure the hands of the user of the shovel are avoided.

The modification illustrated in Figure 7, the shovel handle, is substantially the same as that of Figure 1 except for a filling or plug G of wood extending upwardly through the handles from the upper end $a$ of the shovel stale and except also that an additional rivet H is provided at the lower or socket ends of the arms B for securing the socket ends of the arms with their plugs G to the reinforcing band D.

The wood filler or plug G extending from the upper end of the stale A through the arms B results in a stronger handle for heavy duty shovels, as for example in prying or lifting heavy materials, and also results in closing the arms against the entrance of rain or grit, which, aside from making the handle uselessly heavy, in the absence of such filler or plug, would also result in rust spots inside the handles and consequent erosion and weakening thereof.

The shovel handle shown and above described is also provided with the usual wooden grip C as before stated, and this is secured between the arms B by means of a rivet I and is also secured against turning by means of an inwardly punched projection J which when the grip C is positioned between the arms B embeds itself in the grip.

What I claim is:

1. A D-shovel comprising a pair of tubular pressed steel handle arms secured at their lower or socket ends to the shovel stale and a longitudinally split reinforcing band riveted to said ends and to the stale, the edges of said reinforcing band having inwardly extending means in interlocking engagement with the inner edges of the handle arms.

2. A D-shovel comprising a pair of tubular pressed steel handle arms secured at their lower or socket ends to the shovel stale and a reinforcing band riveted to said ends and to the stale and having hook-like ends engaging two of the contiguous edges of the socket ends.

3. A D-shovel comprising a pair of tubular pressed steel handle arms secured at their lower or socket ends to the shovel stale and a reinforcing band riveted to said ends and to the stale and having hook-like ends engaging two of the contiguous edges of the socket ends and with an inward projection engaging the other contiguous edges of the socket ends.

LEWIS E. WEBSTER.